US010815422B2

(12) United States Patent
Danielec et al.

(10) Patent No.: US 10,815,422 B2
(45) Date of Patent: Oct. 27, 2020

(54) LUMINOPHORE COATING

(71) Applicants: CHT Germany GMBH, Tübingen (DE); Lenzing Aktiengesellschaft, Lenzing (AT)

(72) Inventors: Holger Danielec, Stuttgart (DE); Harald Lutz, Pliezhausen (DE); Andreas Schmid, Reutlingen (DE); Tobias Rollbühler, Gäufelden (DE); Herbert Bachus, Hechingen (DE)

(73) Assignees: CHT Germany GmbH, Tübingen (DE); Lenzing Aktiengesellschaft, Lenzing (AT)

(*) Notice: Subject to any disclaimer, the term of this patent is extended or adjusted under 35 U.S.C. 154(b) by 594 days.

(21) Appl. No.: 14/649,119

(22) PCT Filed: Nov. 19, 2013

(86) PCT No.: PCT/EP2013/074185
§ 371 (c)(1),
(2) Date: Jun. 2, 2015

(87) PCT Pub. No.: WO2014/086579
PCT Pub. Date: Jun. 12, 2014

(65) Prior Publication Data
US 2015/0329771 A1   Nov. 19, 2015

(30) Foreign Application Priority Data

Dec. 3, 2012 (DE) .................. 10 2012 222 045

(51) Int. Cl.
| C09K 11/02 | (2006.01) |
| D01F 1/04 | (2006.01) |
| C09K 11/08 | (2006.01) |
| D06P 1/00 | (2006.01) |
| D01F 2/14 | (2006.01) |
| D01F 2/00 | (2006.01) |

(52) U.S. Cl.
CPC ............ *C09K 11/025* (2013.01); *C09K 11/02* (2013.01); *C09K 11/08* (2013.01); *D01F 1/04* (2013.01); *D01F 2/00* (2013.01); *D01F 2/14* (2013.01); *D06P 1/0012* (2013.01); *Y10T 428/249921* (2015.04)

(58) Field of Classification Search
CPC ....... C09K 11/025; C09K 11/02; C09K 11/08; D06P 1/0012; D01F 2/00; D01F 2/14; D01F 1/04; Y10T 428/249921
See application file for complete search history.

(56) References Cited

U.S. PATENT DOCUMENTS

| 6,217,794 B1 * | 4/2001 | Neal ................... C08K 5/0091 252/301.34 |
| 6,514,609 B1 * | 2/2003 | Siggel .................. C09K 11/02 428/370 |
| 7,691,490 B2 | 4/2010 | Mortz et al. |
| 2001/0045677 A1 | 11/2001 | Kang |
| 2004/0126615 A1 * | 7/2004 | Mortz ................. C09K 11/025 428/690 |
| 2004/0191518 A1 | 9/2004 | Naito |

FOREIGN PATENT DOCUMENTS

| CN | 1414886 A | 4/2003 |
| DE | 3434971 A1 | 3/1986 |
| DE | 195 39 315 A1 | 4/1997 |
| DE | 198 02 588 A1 | 7/1999 |
| DE | 10 2007 005 645 A1 | 8/2008 |
| DE | 10 2009 056 634 A1 | 6/2011 |
| DE | 199 34 436 B4 | 6/2011 |
| WO | 2008/092529 A1 | 8/2008 |

* cited by examiner

*Primary Examiner* — Elizabeth C Imani
(74) *Attorney, Agent, or Firm* — Clements Bernard Walker; Seth L. Hudson

(57) ABSTRACT

The invention relates to stabilized luminophores and in particular to the use thereof in and on textile goods.

5 Claims, No Drawings

LUMINOPHORE COATING

FIELD OF THE INVENTION

The invention relates to stabilized luminophores and, in particular, to the use thereof in and on textile goods.

BACKGROUND

Luminescent fibers have long been known to the skilled person from the use of organic ultraviolet-active dyes. However, the low light stability of these organic dyes is unsuitable for permanent applications. Thermoplastic fibrous materials that contain fluorescent pigments are disclosed in DE 3434971 A1.

Luminescent regenerate fibers based on UV-active inorganic pigments are described in DE 195 39 315 A1. The incorporation of luminescent pigments (luminophore) into the fibers during the spinning process is shown therein. Surprisingly, the pigment size mentioned therein is smaller than 1 µm, because it is known from JP 87-327866 and DE 19934436 B4 that luminescent pigments, especially those based on doped rare earths, lose luminosity once they are ground to a size of smaller than 1 µm. DE 198 02 588 A1 describes the use of such fibers for banknotes and security papers. The documents mentioned are based on a high extra quantity of the luminophores in order to achieve the desired effect. This is very uneconomical, but technically necessary because dwelling times in hot sulfuric acid baths are necessary in the viscose process, in which the acid-unstable luminophores are degraded at least in part. In addition, the inorganic pigments deposit quickly in the process and from the spinning dope because of their relatively high density, so that only part of the pigments employed actually serves to mark the fibers, and further extra quantities are additionally required.

The object of the invention is to provide stabilized luminophores and, in particular, to provide them for application in textile products, precursors and semifinished products.

SUMMARY OF THE INVENTION

In a first embodiment of the invention, the above object is achieved by luminophores with a surface coating based on organic, inorganic-organic and/or inorganic coating agents.

One advantage of the invention is the fact that, for producing luminescent fibers and textiles made therefrom, the luminophores according to the invention can be incorporated in a homogeneous distribution, maintaining the textile properties. According to the invention, the stabilized luminescent pigments (luminophores) can be incorporated into the spinning dope, or applied to the surface of textile fibers, sheets, products or semifinished products by subsequent application.

A particular advantage of the invention is its high economic efficiency, because the coating of the luminophores according to the invention increases their stability, especially towards acids, and thus their use in sulfuric acid spinning baths, as employed in the viscose process, is enabled without substantial proportions of the pigments being decomposed.

DESCRIPTION OF THE PREFERRED EMBODIMENTS

Surprisingly, it has been found that sufficient stability of pigments, including acid-sensitive ones, in the spinning bath is enabled by specific additives and/or a suitable coating of the luminescent particles. Even more surprisingly, it has been found that, consequently, very low extra quantities of luminophore, based on the dry fiber, of from 0.01 to 100 ppm (1 ppm corresponding to 1 mg per kg), preferably from 0.1 to 50 ppm, more preferably from 0.5 to 10 ppm, are sufficient, and therefore an optimum distribution in the spinning dope is obtained, resulting in a homogeneous marking of the fibers.

A surprisingly positive effect is the protection against acids by additions of per se known binders or rheological additives, whose mechanism of action is unknown.

It is known that the larger the diameter of particles is, the more they tend to undesirably deposit in the fiber production process. If this property is optimized by adjusting as small as possible a particle size, the acid sensitivity is the more pronounced because of the larger surface area. Surprisingly, it has been found that particle sizes of from 0.5 µm to 1.0 µm (laser diffraction, particle number, $d_{50}$), preferably from 0.6 µm to 0.9 µm, are still sufficiently protected from the influence of acid in the production process, and can nevertheless be dispersed excellently, whereby inhomogenities on the produced fibers and semifinished products made therefrom are avoided. Further, disturbing deposits on machine parts do not form, so that usual continuous processes are not adversely affected.

The textile properties of a fiber and semifinished and finished products made therefrom are known to change disadvantageously by the use of solid additives, such as pigments. Thus, in particular, the grip and the tearing strength of the fiber are deteriorated. Surprisingly, the disadvantageous effects are circumvented if a small amount is employed, which is preferred according to the invention.

"Luminophores" or "luminescent pigments" as used in the present invention refers to inorganic pigments having luminescent properties. "Luminescent properties" as used in the present invention preferably refers to photoluminescent properties, such as fluorescence and/or phosphorescence. It is particularly preferred to use phosphorescent luminophores, because a better readability of the luminophores is enabled by the longer lifetime of phosphorescence as compared to fluorescence. In particular, this includes anti-Stokes and Stokes particles, which exhibit up conversion and down conversion effects, respectively. Particularly preferred are those exhibiting excitation in the non-visible light, such as UV or IR light, and emission in the visible and/or non-visible light. Such compounds have long been known to the skilled person (cf. Luminescence—From Theory to Applications, ed. C. R. Ronda, Wiley-VCH Publishers, 2008, pp. 133-177).

The luminophores according to the invention include, in particular, binary, ternary or quaternary halides, oxides, oxyhalides, sulfides, oxysulfides, sulfates, oxysulfates, nitrides, oxynitrides, nitrates, oxynitrates, phosphides, phosphates, halophospates, carbonates, silicates, oxysilicates, vanadates, molybdates, tungstenates, germanates or oxygermanates of the elements lithium, sodium, potassium, rubidium, magnesium, calcium, strontium, scandium, yttrium, lanthanum, titanium, zirconium, hafnium, niobium, tantalum, zinc, gadolinium, lutetium, aluminum, gallium and indium. These inorganic solid state compounds are self-activated (donor-acceptor luminescence or charge transfer luminescence), or activated with ions of the following metals: indium, tin, lead, antimony, bismuth, cerium, praseodymium, neodymium, samarium, europium, gadolinium, terbium, dysprosium, holmium, erbium, thulium, ytterbium, titanium, vanadium, manganese, iron, cobalt, nickel, copper, ruthenium, palladium, silver, iridium, platinum and gold.

Coatings of pigments are known to the skilled person from numerous applications. As an example, there may be mentioned the prevention of photocatalysis of titanium dioxide particles, which are provided with various, preferably inorganic, coatings in a standard procedure. Surface functionalizations of luminophores for increasing the dispersibility of the pigments in aqueous or organic solvents are also known (cf. Phosphor Handbook, ed. W. M. Yen, S. Shionoya, H. Yamamoto, 2nd ed., CRC Press, 2007, pp. 396-397).

From DE 10 2009 056634 A1 and the prior art references therein, the use of coatings based on silanol or water glass for improving the stability of particles is known; these are applied in complicated processes, such as coating followed by drying. Such coatings are not included in the present invention.

As suitable coatings for the luminophores according to the invention, organic, inorganic-organic and/or inorganic coatings may be used according to the invention. Silicates, phosphates, pyrophosphates and/or polyphosphates may be employed as preferred inorganic coatings. Polymers, for example, homo-, co- or terpolymers based on polyacrylates, polyurethanes, styrene-butadienes, polybutadienes, epoxy resins, ethylvinyl acetate, polyester resins, or mixtures and/or reaction products of these classes are employed as organic coating in the invention. Preferred according to the invention are cross-linked, cross-linking or reactive systems, especially those that can undergo chemical or associative bonds with the surface of the particles. The coating can be deposited in solution or dispersion on the luminescent pigment, and the dispersion or solution thus obtained can be used immediately. Alternatively, the coated pigment can be separated, for example, filtered off, and dried.

Suitable starting components for the class of polyurethanes include aliphatic, cycloaliphatic, araliphatic, aromatic and heterocyclic polyisocyanates, as described, for example, by W. Siefken in Justus Liebigs Annalen der Chemie, 562, pages 75 to 136, for example, those of formula

in which n=2 to 4, and Q represents an aliphatic hydrocarbyl radical with 2 to 18, preferably 6 to 10, carbon atoms, a cycloaliphatic hydrocarbyl radical with 4 to 15, preferably from 5 to 10, carbon atoms, an aromatic hydrocarbyl radical with 6 to 15, preferably from 6 to 13, carbon atoms, or an aliphatic hydrocarbyl radical with 8 to 15, preferably from 8 to 13, carbon atoms, for example, ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3- and -1,4-diisocyanates, and any mixtures of these isomers, 1-isocyanato-3,3,5-trimethyl-5-isocyanatomethylcyclohexane, 2,4- and 2,6-hexahydrotoluylene diisocyanate, and any mixtures of these isomers, hexahydro-1,3- and -1,4-phenylene diisocyanate, perhydro-2,4'- and -4,4'-diphenylmethane diisocyanate, 1,3- and 1,4-phenylene diisocyanate, 1,4-durene diisocyanate (DDI), 4,4'-stilbene diisocyanate, 3,3'-dimethyl-4,4'-biphenylene diisocyanate (TODI), 2,4- and 2,6-toluylene diisocyanate (TDI), and any mixtures of these isomers, diphenylmethane-2,4'- and/or -4,4'-diisocyanate (MDI), and/or naphthylene 1,5-diisocyanate (NDI).

Further, there may be used, for example: triphenylmethane 4,4',4''-triisocyanates, polyphenyl polymethylene polyisocyanates as obtained by aniline-formaldehyde condensation followed by phosgenation, and described, for example, in GB-PS 874 430 and GB-PS 848 671, m- and p-isocyanatophenylsulfonyl isocyanates according to U.S. Pat. No. 3,454,606 A, perchlorinated aryl polyisocyanates as described in U.S. Pat. No. 3,277,138 A, polyisocyanates having carbodiimide groups, as described in U.S. Pat. No. 3,152,162 A and in DE 25 04 400 A, DE 25 37 685 A and DE 25 52 350 A, norbornane diisocyanates according to U.S. Pat. No. 3,492,301 A, polyisocyanates having allophanate groups, as described in GB 994 890 A, BE 761 626 A and NL 7 102 524 A, polyisocyanates having isocyanurate groups, as described in U.S. Pat. No. 3,001,9731 A, DE 10 22 789 C, DE 12 22 067 C and DE 10 27 394 C, as well as DE 19 29 034 A and DE 20 04 048 A, polyisocyanates having urethane groups, as described, for example, in BE 752 261 C or U.S. Pat. Nos. 3,394,164 A and 3,644,457 A, polyisocyanates having acylated urea groups according to DE 12 30 778 C, polyisocyanates having biuret groups, as described in U.S. Pat. Nos. 3,124,605 A, 3,201,372 A and 3,124,605 A as well as in GB 889 050 A, polyisocyanates prepared by telomerization reactions as described in U.S. Pat. No. 3,654,106 A, polyisocyanates having ester groups, as mentioned in GB 965 474 A and GB 1 072 956 A, in U.S. Pat. No. 3,567,763 A and in DE 12 31 688 B, reaction products of the above mentioned isocyanates with acetals according to DE 10 72 385 C, and polyisocyanates containing polymeric fatty acid esters according to U.S. Pat. No. 3,455,883 A.

It is also possible to employ the distillation residues having isocyanate groups as obtained in the industrial isocyanate production, optionally dissolved in one or more of the above mentioned polyisocyanate. Further, it is possible to employ any mixtures of the above mentioned polyisocyanates.

The technically readily available polyisocyanates are preferably employed, for example, 2,4- and 2,6-toluylene diisocyanate, and any mixtures of these isomers ("TDI"), 4,4'-diphenylmethane diisocyanate, 2,4'-diphenylmethane diisocyanate, 2,2'-diphenylmethane diisocyanate and polyphenyl polymethylene polyisocyanate as prepared by aniline-formaldehyde condensation followed by phosgenation ("raw MDI"), and polyisocyanates having carbodiimide groups, uretone-imine groups, urethane groups, allophanate groups, isocyanurate groups, urea groups or biuret groups ("modified polyisocyanates"), especially those modified polyisocyanates that are derived from 2,4- and/or 2,6-toluylene diisocyanate, or from 4,4'- and/or 2,4'-diphenylmethane diisocyanate. Naphthylene 1,5-diisocyanate and mixtures of the mentioned polyisocyanates are also well suited.

Polyacrylates according to the present invention are prepared, in particular, by solution, precipitation, emulsion or inverse emulsion polymerization.

Acrylates are preferably selected from the group of 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, neopentyl glycol hydroxypivalate di(meth)acrylate, dicyclopentanyl di(meth)acrylate, dicyclopentenyl di(meth)acrylate modified with caprolactam, phosphoric acid di(meth)acrylate modified with ethylene oxide, cyclohexyl di(meth)acrylate modified with an allyl group, isocyanurate di(meth)acrylate, trimethylolpropane tri(meth)acrylate, dipentaerythritol tri(meth)acrylate, dipentaerythritol tri(meth)acrylate modified with propionic acid, pentaerythritol tri(meth)acrylate, trimethylolpropane tri(meth)acrylate modified with propylene oxide, tris(acryloxyethyl) isocyanurate, dipentaerythritol penta(meth)acrylate modified with propionic acid, dipentaerythritol hexa(meth)acrylate, dipentaerythritol hexa(meth)acrylate modified with caprolactam, (meth)acrylate esters monofunctional (meth)acrylates, such as methyl (meth)acrylate, ethyl (meth)acrylate, isopropyl (meth)acrylate, 2-ethylhexyl (meth)acrylate, butyl (meth) acrylate, cyclohexyl (meth)acrylate, tetrahydrofurfuryl (meth)acrylate, 2-hydroxyethyl (meth)acrylate, 2-hydroxypropyl (meth)acrylate, polyethylene glycol mono(meth) acrylate, methoxypolyethylene glycol mono(meth)acrylate, polypropylene glycol mono(meth)acrylate, polyethylene glycol polypropylene glycol mono(meth)acrylate, polyethylene glycol polytetramethylene glycol mono(meth)acrylate, and glycidyl (meth)acrylate; difunctional (meth)acrylate, such as ethylene glycol di(meth)acrylate, diethylene glycol di(meth)acrylate, triethylene glycol di(meth)acrylate, tetraethylene glycol di(meth)acrylate, polyethylene glycol di(meth)acrylate, polypropylene glycol di(meth)acrylate, neopentyl glycol di(meth)acrylate, allyl (meth)acrylate, bisphenol A di(meth)acrylate, ethylene oxide-modified bisphenol-A di(meth)acrylate, polyethylene oxide-modified bisphenol A di(meth)acrylate, ethylene oxide-modified bisphenol S di(meth)acrylate, bisphenol S di(meth)acrylate, 1,4-butanediol di(meth)acrylate, and 1,3-butylene glycol di(meth)acrylate; and tri- and higher functional (meth)acrylates, such as trimethylolpropane tri(meth)acrylate, glycerol tri-(meth)acrylate, pentaerythritol tri(meth)acrylate, pentaerythritol tetra(meth)acrylate, ethylene-modified trimethylolpropane tri(meth)acrylate, dipentaerythritol hexa(meth) acrylate, 2-hydroxyethyl (meth)acrylate, 2-hydroxypropyl (meth)acrylate, isobutyl (meth)acrylate, t-butyl (meth)acrylate, 2-ethylhexyl (meth)acrylate, stearyl acrylate, 2-ethylhexylcarbitol acrylate, omega-carboxypolycaprolactam monoacrylate, acryloyloxyethylic acid, acrylic acid dimer, lauryl (meth)acrylate, 2-methoxyethyl acrylate, butoxyethyl acrylate, ethoxyethoxyethyl acrylate, methoxytriethylene glycol acrylate, methoxypolyethylene glycol acrylate, stearyl (meth)acrylate, cyclohexyl (meth)acrylate, tetrahydrofurfuryl (meth)acrylate, N-vinyl-2-pyrrolidone, isobornyl (meth)acrylate, dicyclopentenyl acrylate, benzyl acrylate, phenyl glycidyl ether epoxyacrylate, phenoxyethyl (meth)acrylate, phenoxy(poly)ethylene glycol acrylate, nonylphenol ethoxylated acrylate, acryloyloxyethylphthalic acid, tribromophenyl acrylate, tribromophenol ethoxylated (meth)acrylate, methyl methacrylate, tribromophenyl methacrylate, methacryloxyethylic acid, methacryloyloxyethylmaleic acid, methacryloyloxyethylhexahydrophthalic acid, methacryloyloxyethylphthalic acid, polyethylene glycol (meth)acrylate, polypropylene glycol (meth)acrylate, beta-carboxyethyl acrylate, N-methylol acrylamide, N-methoxymethyl acrylamide, N-ethoxymethyl acrylamide, N-n-butoxymethyl acrylamide, t-Butyl acrylamide sulfonic acid, vinyl stearate, N-methyl acrylamide, N-dimethyl acrylamide, N-dimethylaminoethyl (meth)acrylate, N-dimethylaminopropyl acrylamide, acryloylmorpholine, glycidyl methacrylate, n-butyl methacrylate, ethyl methacrylate, allyl methacrylate, cetyl methacrylate, pentadecyl methacrylate, methoxypolyethylene glycol (meth)acrylate, diethylaminoethyl (meth)acrylate, methacryloyloxyethylsuccinic acid, hexanediol diacrylate, neopentyl glycol diacrylate, triethylene glycol diacrylate, polyethylene glycol diacrylate, polypropylene glycol diacrylate, pentaerythritol diacrylate monostearate, glycol diacrylate, 2-hydroxyethylmethacryloyl phosphate, bisphenol A/ethylene glycol adduct acrylate, bisphenol F/ethylene glycol adduct acrylate, tricyclodecanemethanol diacrylate, Trishydroxyethyl isocyanurate diacrylate, 2-hydroxy-1-acryloxy-3-methacryloxypropane, trimethylolpropane triacrylate, trimethylolpropane/ethylene glycol adduct triacrylate, trimethylolpropane/propylene glycol adduct triacrylate, pentaerythritol triacrylate, trisacryloyloxyethyl phosphate, trishydroxyethyl isocyanurate triacrylate, modified epsilon-caprolactam triacrylate, trimethylolpropane ethoxy triacrylate, glycerol propylene glycol adduct triacrylate, pentaerythritol tetraacrylate, pentaerythritol ethylene glycol adduct tetraacrylate, ditrimethylolpropane tetraacrylate, dipentaerythritol hexa(penta)acrylate, dipentaerythritolmonohydroxy pentaacrylate, acrylic acid, methacrylic acid, urethane acrylate, epoxy acrylate, polyester acrylates, and/or unsaturated polyester acrylates. Further suitable are co- and terpolymers of the mentioned acrylates with monomers such as styrene, vinyl acetate, ethylvinyl acetate, gamma acryloyl-oxypropyltrimethoxysilane, gamma-acryloyloxypropyltriethoxysilane, gamma-methacryloyloxypropyltrimethoxysilane, gamma-methacryloyloxypropyltriethoxysilane, dimethyldimethoxysilane, dimethyldiethoxysilane, methylphenyldimethoxysilane, vinyltrimethoxysilane, vinyltriethoxysilane, divinyldimethoxysilane, divinyldiethoxysilane, itaconic acid, vinylphosphonic acid, esters of vinylphosphonic acid and/or vinyl esters of Koch acids.

As inorganic-organic coatings for the luminophores, sol-gels, silicones and silanes may preferably be used according to the invention. As starting materials for the sol-gel polymers may serve, for example, the following organosilicon compounds or mixtures thereof, which are selected from the group of tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, trimethoxysilane hydride, triethoxysilane hydride, tripropoxysilane hydride, methyltrimethoxysilane, methyltriethoxysilane, methyltripropoxysilane, methyl-tri-isopropoxysilane, ethyltrimethoxysilane, ethyltriethoxysilane, propyltriethoxysilane, butyltrimethoxysilane, phenyltrimethoxysilane, phenyltriethoxysilane, gamma-glycidoxypropyltrimethoxysilane, gamma-acryloyloxypropyltrimethoxysilane, gamma-methacryloyloxypropyltrimethoxysilane, dimethyldimethoxysilane, methylphenyldimethoxysilane, vinyltrimethoxysilane, vinyltriethoxysilane, divinyldimethoxysilane, divinyldiethoxysilane, aminopropyltriethoxysilane, 3-aminopropyltrimethoxysilane, 3-aminopropyltriethoxysilane, 3-aminopropyl-methyldimethoxysilane, 3-aminopropylmethyldiethoxysilane, N-(n-butyl)-3-aminopropyltrimethoxysilane, N-(n-butyl)-3-aminopropyltriethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(2-aminoethyl)-3-aminopropylmethyldiethoxysilane and/or (3-trimethoxysilylpropyl)diethylene triamine. Further, alkylene- or arylene-bridged di- or oligosilanes, such as 1,2-bis(triethoxysilyl)ethane, 1,2-bis (trimethoxysilyl)ethane, 1,4-phenylenebis(triethoxysilane), 1,4-phenylenbis(trimethoxysilane) are suitable. In addition, aluminum salts, aluminum alcoholates, zinc salts, zinc alcoholates, zirconium salts, zirconium alcoholates, titanium salts, titanium alcoholates, iron salts, iron alcoholates, manganese salts or manganese alcoholates may be employed as reactants of the systems.

The coating or the polymer is preferably prepared in water and/or organic solvents, optionally with the aid of dispersants, especially in mono-, oligo- or polyfunctional alcohols, more preferably in aqueous solutions of the above mentioned alcohols. The cross-linking by hydrolysis of the building blocks and subsequent condensation of the hydrolyzed reactants is mediated by mineral or organic acids, alkalis, organic bases, transition metal catalysts, such as titanates and/or zirconates, and/or protic solvents, preferably water, because the latter is advantageous under safety aspects, such as inflammability, and for ecological aspects, the coating agents being obtained as a colloidal solution or dispersion. Also, the silanes stated above can be directly applied to the pigment, and the cross-linking between the silane and the surface of the pigment can be initiated by one of the mentioned mediators.

Silicone polymers mostly consist of the repeating unit dimethylsiloxane, which can be supplemented by other siloxane groups, for example, by equilibration reactions.

Thus, the polymer has the structure

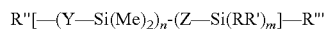

where m and n independently represent values of from 0 to 100,000. The base moiety functionalized with two methyl groups (designated as Me in the above mentioned schematic formula) —(O—Si(Me$_2$)— may in part or completely be replaced by moieties of the type —(O—SiRR')—, wherein R and R' may independently be modified, and may optionally contain functionalized organic radicals of the type alkyl, aryl, alkenyl, alkylaryl, arylalkyl, arylalkenyl, alkenylaryl, hydrogen, hydroxy, amine. The radicals may be bonded to the central silicon atom directly, or through a heteroatom, such as oxygen or nitrogen. The silicon units are linked through a group Y, or are directly bonded together. Y and Z are independently selected from the above mentioned organic groups or from the group of the mentioned heteroatoms. The polymer may carry in $\alpha,\omega$-position terminal groups R" and/or R"' from the above mentioned groups, which may be selected independently.

Also, mixtures of the polymers or coatings according to the invention can be employed. These mixtures may be realized by formulation and/or chemical linking of the different polymers/coatings, for example, in terms of a core-shell encapsulation or interpenetrating network.

The luminophores according to the invention are directly added to the spinning dope in the form of dispersions, slurries, masterbatches and/or powders, and the luminescent fibers are spun. These fibers may be prepared either by dissolution and precipitation methods, or by chemical functionalization, dissolution and subsequent precipitation, such as by the viscose, cupro or Lyocell process. The processes for preparing cellulose acetate or cellulose esters may also be employed for preparing the fibers according to the invention.

For example, dispersing aids from the group of anion-active, cation-active or non-ionogenic surfactants may be employed for preparing the dispersions or solutions. Anion-active or non-ionogenic surfactants are particularly preferred for reasons of compatibility with other textile auxiliaries. The addition of rheological additives, such as carboxyalkylpolysaccharides or polyacrylates, is possible to adjust the viscosity of the textile auxiliary.

The coated luminophores and formulations containing them, on which the invention is based, may also be combined with usual textile auxiliaries known to the skilled person, and applied together in textile standard methods. These include, for example, fluorocarbons, plasticizers, finishing resins, brighteners, dyes, hydrophilization or hydrophobization agents, antipilling additives, fixing agents, cross-linking agents, surfactants, polymeric binders, adhesives, anti-slip agents, and/or pigments. The thus obtained textile auxiliaries can be employed as liquors, foams or pastes for the textile finishing of fibers, fabrics, knitwear or non-wovens. A combination of these mentioned additives and the above mentioned components to form one formulation for finishing textiles is also according to the invention. For example, exhaust methods or compulsory applications, such as coating, finishing by padding, compression, spray methods, single thread application and/or dyeing may be used as suitable processes of textile technology.

EXAMPLES

All percentages in the Examples are mass percentages. A "ppm" is defined as 1 mg/kg. The residues of the pigments were analyzed by means of ICP-OES (inductively coupled plasma/optical emission spectroscopy, Thermo Scientific ICP-OES iCAP 6500). The "degree of decomposition" is defined as the amount already degraded according to the reaction conditions.

Reference Example 1-3

Commercially available luminophores were heated in 10% by weight sulfuric acid to 90° C. The degree of decomposition was determined after 5 min and 15 min.

| Reference Example | Luminophore | Degree of decomposition after 5 min | Degree of decomposition after 15 min |
|---|---|---|---|
| 1 | IRUCG IR phosphor, from LDP LLC | 64% | 92% |
| 2 | F(a)SD-546-4, from Luminophor | 78% | 98% |
| 3 | F(a)SD-475-2, from Luminophor | 81% | 100% |

Example 1

Under an inert gas atmosphere, 5 g of the luminophore employed in Reference Example 1 was charged in 500 ml of absolute methanol, and mixed with stirring with 500 µl of Dynasylan® MEMO and 1 ml of methyl methacrylate. To start the polymerization, 14 mg of ammonium persulfate was added, and the reaction mixture was stirred at 60° C. for 6 h. The coated particles were filtered off and dried in a drying cabinet at 80° C. to constant weight. The thus coated luminophores were subjected to the conditions described in Reference Example 1. After 15 min, 17% of the coated particles were not decomposed.

Example 2

Under an inert gas atmosphere, 5 g of the luminophore employed in Reference Example 1 was charged in 500 ml of degassed distilled water, and mixed with stirring with 1 ml of the isomer mixture of 2-hydroxypropyl methacrylate and 3-hydroxypropyl methacrylate. To start the polymerization, 14 mg of ammonium persulfate was added, and the reaction mixture was stirred at 60° C. for 6 h. The coated particles were filtered off and dried in a drying cabinet at 80° C. to constant weight. These particles were subjected to the acidic conditions mentioned in the Reference Example, and after 15 min, 28% of the particles were intact.

Example 3

Under an inert gas atmosphere, 5 g of the luminophore employed in Reference Example 1 was charged in 500 ml of degassed distilled water, and with stirring, a mixture of 5%

Tubicoat ASD (polyacrylate copolymer from CHT R. Beitlich GmbH) and 2% iSys LTX (sol-gel product from CHT R. Beitlich GmbH) was admixed. The particles were stirred at 40° C. for 1 h, filtered off and dried in a drying cabinet at 80° C. to constant weight. The thus obtained particles were subjected to the acidic conditions mentioned in the Reference Example, and after 15 min, 40% of the particles were still intact.

Example 4

Under an inert gas atmosphere, 5 g of the luminophore employed in Reference Example 2 was charged in 500 ml of absolute methanol, and mixed with stirring with 500 µl of Dynasylan® MEMO and 1 ml of methyl methacrylate. To start the polymerization, 14 mg of ammonium persulfate was added, and the reaction mixture was stirred at 60° C. for 6 h. The coated particles were filtered off and dried in a drying cabinet at 80° C. to constant weight. The thus coated luminophores were subjected to the conditions described in Reference Example 1. After 15 min, 18% of the coated particles were not decomposed.

Example 5

Under an inert gas atmosphere, 5 g of the luminophore employed in Reference Example 2 was charged in 500 ml of degassed distilled water, and mixed with stirring with 1 ml of the isomer mixture of 2-hydroxypropyl methacrylate and 3-hydroxypropyl methacrylate. To start the polymerization, 14 mg of ammonium persulfate was added, and the reaction mixture was stirred at 60° C. for 6 h. The coated particles were filtered off and dried in a drying cabinet at 80° C. to constant weight. These particles were subjected to the acidic conditions mentioned in the Reference Example, and after 15 min, 42% of the particles were intact.

Example 6

Under an inert gas atmosphere, 5 g of the luminophore employed in Reference Example 2 was charged in 500 ml of degassed distilled water, and with stirring, a mixture of 5% Tubicoat ASD (polyacrylate copolymer from CHT R. Beitlich GmbH) and 2% iSys LTX (sol-gel product from CHT R. Beitlich GmbH) was admixed. The particles were stirred at 40° C. for 1 h, filtered off and dried in a drying cabinet at 80° C. to constant weight. The thus obtained particles were subjected to the acidic conditions mentioned in the Reference Example, and after 15 min, 25% of the particles were still intact.

Example 7

Under an inert gas atmosphere, 5 g of the luminophore employed in Reference Example 3 was charged in 500 ml of degassed distilled water, and mixed with stirring with 1 ml of the isomer mixture of 2-hydroxypropyl methacrylate and 3-hydroxypropyl methacrylate. To start the polymerization, 14 mg of ammonium persulfate was added, and the reaction mixture was stirred at 60° C. for 6 h. The coated particles were filtered off and dried in a drying cabinet at 80° C. to constant weight. These particles were subjected to the acidic conditions mentioned in the Reference Example, and after 15 min, 39% of the particles were intact.

Example 8

Under an inert gas atmosphere, 5 g of the luminophore employed in Reference Example 3 was charged in 500 ml of degassed distilled water, and with stirring, a mixture of 5% Tubicoat ASD (polyacrylate copolymer from CHT R. Beitlich GmbH) and 2% iSys LTX (sol-gel product from CHT R. Beitlich GmbH) was admixed. The particles were stirred at 40° C. for 1 h, filtered off and dried in a drying cabinet at 80° C. to constant weight. The thus obtained particles were subjected to the acidic conditions mentioned in the Reference Example, and after 15 min, 24% of the particles were still intact.

Examples 9-11—Variations of Layer Thickness

Under an inert gas atmosphere, 5 g of the luminophore employed in Reference Example 2 was charged in 500 ml of degassed distilled water, and mixed with stirring with the isomer mixture of 2-hydroxypropyl methacrylate and 3-hydroxypropyl methacrylate. To start the polymerization, ammonium persulfate was added, and the reaction mixture was stirred at 60° C. for 6 h. The coated particles were filtered off and dried in a drying cabinet at 80° C. to constant weight. These particles were subjected to the acidic conditions mentioned in the Reference Example, and the proportions of non-decomposed pigments were analyzed quantitatively.

|    | Methacrylate | Ammonium persulfate | Degree of decomposition after 15 min |
|----|--------------|---------------------|--------------------------------------|
| 9  | 0.25 ml      | 3.5 mg              | 52%                                  |
| 10 | 1 ml         | 14 mg               | 49%                                  |
| 11 | 2.5 ml       | 35 mg               | 39%                                  |

Example 12

A poplin specimen made of polyester was finished on a padding machine with a liquor consisting of the luminophore from Reference Example 1 and 50 g/l of the polyurethane binder Arristan EPD from the company CHT R. Beitlich GmbH. The amount of luminophore was adjusted by liquor uptake experiments to such a value that 40 ppm luminophore became applied to the fabric. After drying on a tenter frame at 120° C. for 3 min, the pigment could be detected by fluorescence spectroscopy, and was found to be homogeneously distributed. After household laundering at 40° C., 43% of the luminophore, and after 10 washes, 15% of the luminophore could still be detected with certainty.

Example 13

Luminescent particles from Reference Example 1 were ground to different mean particle sizes, and subsequently coated according to Example 1. Thereafter, they were homogeneously stirred into an aqueous solution adjusted to 100 mPa·s (spindle 1, Brookfield viscometer) with an acrylate-based thickener (Hycryl® 0262 from the company Arkema). The settling speed of the particles was determined with a commercially available laser pen ($\lambda$=980 nm).

| Example | $d_{50}$ [µm] | Settling time* [h] |
|---------|---------------|--------------------|
| 1       | 4.0           | 0.5                |
| 2       | 2.1           | 12                 |
| 3       | 0.9           | 72                 |

*The settling time includes the time until no pigment can be detected in the supernatant solution anymore.

Example 14

Luminescent particles from Reference Example 2 were ground to different mean particle sizes, and subsequently coated according to Example 5. Thereafter, they were homogeneously stirred into an aqueous solution adjusted to 100 mPa·s (spindle 1, Brookfield viscometer) with an cellulose ether-based thickener (Tubicoat thickener HEC from the company CHT). The sedimentation stability was tested by centrifuging at different revolutions per minute. The completeness of the settling was determined with a commercially available laser pen ($\lambda$=980 nm).

| Revolutions per minute [rpm] | $d_{50}$ [μm] | Settling |
|---|---|---|
| 3000 | 11.6 | complete |
|  | 0.96 | incomplete |

Example 15

A dispersion of the luminescent pigment mentioned in Example 3 was stirred homogeneously into a ready-to-spin modal viscose (5.97% cellulose, 6.14% alkali). Different extra quantities of the pigment with respect to the cellulose were added to the spinning dope, and spun through a spinneret with 1380 holes of 45 μm each into a usual sulfuric acid spinning bath, in which no abnormalities could be observed. The fibers were washed completely, dried, and subsequently, the fiber strength and the fiber elongation were measured.

|  | Example | Luminophore on cellulose [ppm] | Fiber strength, conditioned [cN/tex] | Elongation, conditioned [%] |
|---|---|---|---|---|
| Modal 1.3 dtex | 1 | 7.5 | 35.8 | 12.8 |
|  | 2 | 1500 | 33.6 | 12.3 |

Example 16

A dispersion containing 2% of the luminescent pigment mentioned in Example 3 was stirred homogeneously into 78% NMMO in water, and homogenized by means of an Ultraturrax® (high speed stirrer). Subsequently, cellulose was added, followed by distilling off water in vacuum in order to solubilize the cellulose. The spinning dope was spun into a spinning bath (20% NMMO), and the spinning performance observed was very good. The fibers were subsequently washed to be NMMO-free, then dried, and ultimately, the fiber strength and fiber elongation were determined.

|  | Example | Luminophore on cellulose [ppm] | Fiber strength, conditioned [cN/tex] | Elongation, conditioned [%] |
|---|---|---|---|---|
| Lyocell 1.3 dtex | 1 | 1000 | 37 | 10.6 |
|  | 2 | 30,000 | 34.1 | 9.8 |

The invention claimed is:

1. Natural and/or synthetic fibers or textiles comprising luminophores with a surface coating based on organic coating agents containing polyacrylates on the surface of the luminophores, wherein the quantity of luminophores to the fibers or textiles is from 0.01 to 100 ppm and wherein said luminophores are anti-Stokes particles, which exhibit up conversion.

2. The fibers or textiles according to claim 1, characterized by comprising regenerate fibers or cellulosic molded parts.

3. The fibers or textiles according to claim 1, wherein the fibers or textiles are a dry fiber, a dry textile, a dry molded part or a dry semifinished product and the quantity of luminophores to the dry fiber, dry textile, dry molded part or dry semifinished product is from 0.1 to 50 ppm.

4. The fibers or textiles according to claim 1, characterized in that the mean particle size of the luminophores is from 0.1 to 30 μm.

5. The fibers and textiles according to claim 1, characterized in that said organic coating agents contain silanes, silicones and/or sol-gels.

* * * * *